United States Patent
Braat et al.

(10) Patent No.: US 9,461,571 B2
(45) Date of Patent: Oct. 4, 2016

(54) METHOD AND ELECTRONIC CIRCUIT FOR MOTOR STALL DETECTION

(71) Applicant: MELEXIS TECHNOLOGIES NV, Tessenderlo (BE)

(72) Inventors: Marcel Jakobus Gerardus Braat, Best (NL); Marc Lambrechts, Kessel-Lo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 18 days.

(21) Appl. No.: 14/714,426

(22) Filed: May 18, 2015

(65) Prior Publication Data

US 2016/0013743 A1 Jan. 14, 2016

(30) Foreign Application Priority Data

Jul. 11, 2014 (GB) .................... 1412333.5

(51) Int. Cl.
H02H 7/08 (2006.01)
H02P 8/36 (2006.01)
H02P 8/38 (2006.01)
H02P 8/22 (2006.01)

(52) U.S. Cl.
CPC . *H02P 8/38* (2013.01); *H02P 8/22* (2013.01); *H02P 8/36* (2013.01); *H02P 29/0241* (2016.02)

(58) Field of Classification Search
CPC ............. H02P 8/36; H02P 8/38; H02P 8/22; H02H 7/08
USPC ...................... 318/434; 361/23–34
See application file for complete search history.

(56) References Cited

U.S. PATENT DOCUMENTS

| 7,224,140 | B2 * | 5/2007 | Arefeen ................ H02P 8/38 318/560 |
| 7,432,682 | B2 | 10/2008 | Rondot et al. |
| 7,705,555 | B2 | 4/2010 | Pinewski et al. |
| 8,716,971 | B2 * | 5/2014 | Lopez-Diaz ............. H02P 6/18 318/490 |
| 2012/0304914 | A1 | 12/2012 | Russ |

FOREIGN PATENT DOCUMENTS

DE 102010042494 * 4/2012

OTHER PUBLICATIONS

Extended European Search Report from corresponding EP Application No. 15168186.3, Dec. 11, 2015.*
Search Report from corresponding GB Patent Application No. GB1412333.5, Jan. 12, 2015.

* cited by examiner

*Primary Examiner* — Bentsu Ro
(74) *Attorney, Agent, or Firm* — Workman Nydegger

(57) ABSTRACT

A method of detecting stall of a multi-phase motor operated in a micro-stepped mode, the method comprising: a) applying at least two phase-shifted micro-stepped waveforms to the phase windings of the motor; b) determining a sum of currents flowing through the phase windings, and taking samples of the sum of currents synchronously with the application of the micro-stepped waveforms; c) calculating a moving average or moving sum of the samples over one or more "full steps" of the phase-shifted waveforms; d) calculating an adaptive threshold based on the samples; e) detecting stall of the motor when the moving average is larger than the adaptive threshold. An electrical circuit and a computer program are arranged to perform the method.

15 Claims, 7 Drawing Sheets

METHOD AND ELECTRONIC CIRCUIT FOR MOTOR STALL DETECTION

FIELD OF THE INVENTION

The present invention relates to the field of sensorless multi-phase motors, such as brushless DC (BLDC) motors or stepper motors. In particular, the present invention provides a method and device for detecting stall of a two-phase or three-phase sensorless motor being driven in so called "micro-stepped" mode.

BACKGROUND OF THE INVENTION

Brushless Direct Current (BLDC) motors are a type of electrical motors having multiple phase windings (e.g. two or three or more) and a permanent magnet as a rotor (e.g. a bar magnet or a multi-pole magnet). BLDC motors do not use brushes for commutation, but instead they are electronically commutated. This implies, however, that the drive circuit must know the relative position of the rotor with respect to the stator, in order to direct the magnetic field for exerting torque on the rotor. One known way to do so is by adding positioning means to the motor, such as e.g. optical positioning means or magnetic positioning means.

The present invention, however, is related to a category of motors without such additional positioning means, known as "sensor-less" motors. In such motors, the relative position of the rotor (with respect to the stator) is typically determined based on measurements of the so called "back EMF (BEMF)" or "back voltage". This method is especially suited for three-phase motors, whereby two of the three phase windings are powered by block waves, while the third winding is left unpowered. The back EMF can then be measured over this third winding. By monitoring the back EMF, the motor drive circuit can derive the relative rotor position, and adjust the commutation accordingly. The BEMF can also be used to determine whether the rotor has stopped, e.g. because it is blocked or has reached an end stop.

A problem with such motors is that the torque is limited, because only two of the three windings are powered. Another problem is that the torque is not constant, which results in increased noise and vibrations. Both of these problems are solved in the art by using motors having windings arranged such that they would create a sinusoidal-alike BEMF voltage (if they were mechanically driven externally). These motors should ideally be driven by three simultaneous sinusoidal waveforms, but have the problem that there is then no winding anymore for monitoring the BEMF. Some solutions are proposed in the art, whereby one of the windings is temporarily opened, so that the BEMF can be monitored (albeit briefly).

U.S. Pat. No. 7,432,682(B2) describes a different approach, not based on the back-EMF, but on the sum of the currents flowing through the phase windings. The US patent describes how phase-shifted waveforms (replicated herein as FIG. 2) are applied to the phase windings, using a drive circuit (replicated herein as FIG. 3). The sum of the currents is then measured over a resistor R1, which signal is low-pass filtered by an RC-filter, and then sampled. Then statistical analysis is applied to the samples, so as to determine the "variance" of the sample-values. When the motor is running at normal speed this variance is relatively low, but when the motor has reached its end position, the variance is large. This phenomenon is used to determine whether the motor has stalled. However, this technique is complex.

SUMMARY OF THE INVENTION

It is an object of embodiments of the present invention to provide a good method and a good electronic circuit for detecting "stall" of a multi-phase brushless and sensorless motor, in particular a BLDC motor or a stepper motor having two or three phases.

It is an object of particular embodiments of the present invention to provide a method and an electronic circuit that is more robust in detecting a stall-condition.

It is an object of particular embodiments of the present invention to provide a method and an electronic circuit that is less complex than the prior art.

According to a first aspect, the present invention provides a method of detecting stall of a two-phase or three-phase motor operated in a micro-stepped mode, the method comprising: a) applying a plurality of phase-shifted micro-stepped waveforms to the phase windings of said motor, whereby the phase-shift is about 120° in case of a three-phase motor and about 90° in case of a two-phase motor; b) determining a sum of currents flowing through the phase windings of said motor, and taking samples of said sum of currents synchronously with the application of said micro-stepped waveforms; c) calculating a moving average or a moving sum of said samples over a number of samples corresponding to an even multiple of 60°, e.g. 120° of the micro-stepped waveform in case of a three-phase motor and corresponding to an even multiple of 90°, e.g. 180° of the micro-stepped waveform in case of a two-phase motor; d) calculating an adaptive threshold based on said samples; e) detecting stall of the motor when the moving average or moving sum is larger than said adaptive threshold.

In case of a three-phase motor, the phase windings (coils) are typically oriented 120° apart, and since the current in each winding can be sent in one of two directions, the phase windings form six so called "full steps" of 60° each. The moving average is calculated over an even multiple of such "full steps", hence is calculated over a sample window corresponding to 2×60°=120° (or 4×60°=240° or 360°, etc.) angular distance of the waveform. For example, if the waveform has 48 micro-steps per electrical period, the running average (or running sum) is calculated over 16 (or 32 or 48, etc.) samples.

In case of a two-phase motor, the phase windings (coils) are typically oriented 90° apart, and form four "full steps" of 90° each. In this case the moving average can be calculated over 2×90°=180° (or 4×90°=360°, etc.)

It is an advantage that the output of such averaging operation provides a stable current value, whereby the effects of micro-stepping are substantially reduced (as can be seen in the Figures).

It is an advantage of embodiments of the present invention that the method does not require measurements of the induced back-EMF for determining if a stall has occurred, but is based on the measurement of the total current through the phase windings. This is an advantage because for a sinusoidal motor all phases are driven simultaneously, and would otherwise have to be interrupted.

It is an advantage of using micro-stepping, in that the rotor displacement increments are much finer than in the "whole step" approach, which leads to less operating noise.

It is an advantage of comparing the running average (or running sum) of the current samples with a threshold, rather than calculating a variance or standard deviation of the current samples with a fixed threshold, because it is computationally much easier, and can be implemented in a less powerful processor.

It is an advantage of using an adaptive threshold, as opposed to a fixed predetermined threshold, because in that way aspects such as variations due to different speed, load, aging, wear and the like are taken into account automatically. Moreover, calibration (which is very expensive in a production environment) can be avoided. This is very important in a high-competitive market.

It is an advantage that the samples are taken synchronously with the micro-steps, (e.g. at the end of each micro-step), since this allows samples to be taken after the transient behavior has disappeared, resulting in samples with less noise.

Preferably the samples are digitized by means of an analog to digital convertor (ADC). This allows the samples to be processed in the digital domain.

It is an advantage of calculating a running average of synchronous samples, rather than calculating statistical values of asynchronous samples, because it requires much less processing power, and delivers a clean signal, from which it is possible to robustly differentiate between running at normal speed, or being in a stall-situation.

Using simple arithmetic allows the use of a simple (less expensive) microcontroller, and/or to evaluate the stall-situation every micro-step, and/or to increase the number of micro-steps per electrical period.

The method is especially suited for controlling air-flaps or grill shutters or the like in automotive applications.

In an embodiment of the method, calculating the adaptive threshold comprises calculating a low-pass-filtered version of said moving average or moving sum, and setting the adaptive threshold as the low-pass-filtered version of the moving average or moving sum multiplied by a predefined constant value.

The inventors have found that using such value as the adaptive threshold provides a good way for detecting a sudden current increase in the motor for the detection of an end stop or stall of the motor.

In addition, by comparing the moving average (or moving sum) with a low-pass-filtered version of itself, it is guaranteed that they are the same in steady state (constant motor speed).

The predefined constant value may be chosen in the range of 1.10 to 1.50.

The predefined constant value can be determined by the skilled person by routine tests performed on the system at hand (e.g. including a specific motor with a specific gear box and a specific air flap etc). If the value of the predefined constant is chosen too small, then small obstacles or hick-ups may be falsely detected as a stall. If the value is chosen too large, then an actual motor stall may not be recognized as such, or may be detected relatively late.

In an embodiment, calculating a low-pass-filtered version of the moving average or moving sum comprises calculating said low-pass-filtered version by means of an IIR filter.

It is an advantage of using an IIR filter (rather than e.g. a FIR filter) in that it requires only limited processing power. A low order IIR filter, e.g. a first order filter, is sufficient for application of the present invention.

In an embodiment, said sum of currents is measured over a resistor.

The resistor may be connected in series with a motor driver circuit. The motor driver circuit may comprise a plurality of dual H-bridges, connected between a supply voltage and ground, and having inputs for receiving PWM-signals, and outputs connectable to the motor windings. Preferably a single resistor is used, but that is not absolutely required.

In an embodiment, the motor is a bipolar BLDC motor or a bipolar stepper motor or a unipolar stepper motor or a three-phase BLDC motor or a single coil two-phase BLDC motor or a three-phase stepper motor.

The method of the present invention is ideally suited for this kind of motors.

In an embodiment, applying said micro-stepped waveforms comprises applying PWM-signals to a motor driver circuit.

The PWM-signals may be generated by dedicated hardware-blocks of a microcontroller, or may be generated in software by simply setting an output-port "high" or "low" for a certain number of clock cycles.

The use of PWM signals for generating micro-steps is known per se, but the combination of using PWM-signals for the micro-steps in combination with synchronous sampling (e.g. at the end of each micro-step) does not seem to be generally known.

It is noted that the PWM-signals may be applied directly to the motor (e.g. when using an ASIC with an embedded motor driver), or alternatively, an integrated controller may be used applying PWM signals to an external drive circuit, e.g. consisting of a plurality of transistors arranged as dual H-bridges.

The method may further comprise a step of measuring a supply voltage supplied to the motor driver circuit, wherein the PWM signals are generated taking into account the measured supply voltage such that the resulting current through the phase windings is substantially independent of the supply voltage.

Preferably the PWM signals are obtained from a waveform-table, but corrected inversely proportional to the measured supply voltage.

It is an advantage of embodiments of the present invention that the supply voltage is taken into account when generating the PWM-signals, because it makes the method also robust against supply variations, without requiring power-stabilization circuitry (such as DC-DC convertors).

It is an advantage of embodiments of the present invention that corrective action can be taken for voltage supply variation at micro-step level. This allows (almost) instantaneous correction.

Since the stall-detection is based on the current flowing through the windings, the stall-detection method described above is made robust against power-supply variations.

In an embodiment, the supply voltage is measured multiple times during a single microstep, and during said single microstep multiple corresponding PWM-signals are applied during a fraction of the microstep.

This may be particularly interesting when the motor is driven at a relatively low speed, e.g. a speed below a predefined threshold, because then a microstep may take relatively long, and the supply voltage may change during a single microstep. By taking a sample of the supply voltage and applying a corresponding PWM signal multiple times in a single microstep, variations of the supply voltage can be even better compensated for.

According to a second aspect, the present invention also provides a method of driving a multi-phase motor in a first direction until an end stop, the method comprising the steps of, subsequently: i) driving the motor in a second direction opposite the first direction; ii) driving the motor in the first direction using a method according to any of the embodiments of the first aspect.

The purpose of the reverse driving (irrespective of whether the motor was actually at the start position, and could not rotate backwards), is to make sure that the motor can reach nominal speed in the next step, so that a stall can be reliably detected using the algorithm described above. This avoids the problem of potential missing of stall-detection in case the motor was too close to the end-stop already. First driving the motor in the opposite direction solves this problem.

According to a third aspect, the present invention also provides an electronic circuit for driving a two-phase or a three-phase motor and for detecting stall of said motor, the electronic circuit comprising: a) means for applying a plurality of phase-shifted micro-stepped waveforms to the phase windings of said motor, whereby the phase-shift is about 120° in case of a three-phase motor and about 90° in case of a two-phase motor; b) an analog-to-digital convertor (ADC) for taking samples of a sum of currents flowing through the phase windings in a manner synchronous with the application of said micro-stepped waveforms; c) a programmable processor configured for calculating a moving average or moving sum over a number of samples corresponding to an even multiple of 60°, e.g. 120° of the micro-stepped waveform in case of a three-phase motor and corresponding to an even multiple of 90°, e.g. 180° of the micro-stepped waveform in case of a two-phase motor, and configured for calculating an adaptive threshold based on said samples, and configured for detecting stall of the motor when the moving average or moving sum is larger than said adaptive threshold.

In an embodiment the electronic circuit comprises a microcontroller or ASIC with at least one ADC (embedded or not), and a motor driver circuit (embedded or not), and a resistor (embedded or not) arranged for measuring the sum of currents flowing through the motor windings.

In a specific preferred embodiment the electronic circuit comprises a single ASIC with at least one embedded PWM-module and at least one embedded ADC and a programmable processor connected to a memory and comprising instructions for perform any of the methods described above.

In an embodiment, the electronic circuit further comprises a motor-driver circuit and PWM generators for applying PWM-signals corresponding to said micro-stepped waveforms to the motor driver circuit.

In an embodiment, the electronic circuit further comprises means for measuring a supply voltage supplied to the motor driver circuit, and the PWM generators are configured for taking into account the measured supply voltage such that the resulting current through the phase windings is substantially independent of the supply voltage.

According to a fourth aspect, the present invention also provides a computer program product for executing a method according to any of the embodiments of the first aspect, when executed on the programmable processor of the electronic circuit according to any of the embodiments of the second aspect.

According to a fifth aspect, the present invention also provides a system comprising a two-phase or a three-phase motor, and a resistor configured for measuring a sum of the currents flowing through the phase windings of the motor, and an electronic circuit according to any of the embodiments of the second aspect connected to said motor.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

Figure 1:
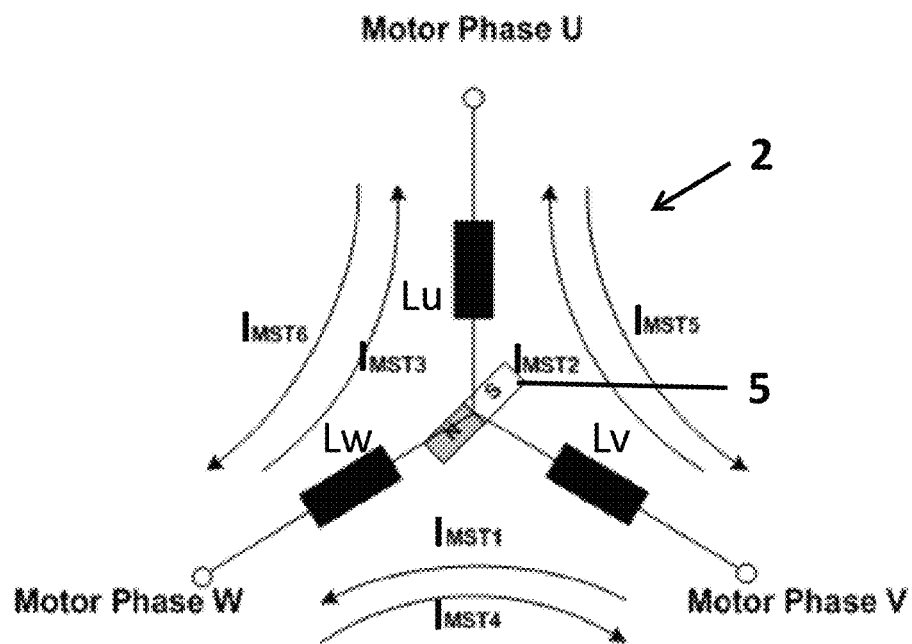
FIG. 1 shows a schematic representation of a three-phase, star connected BLDC stator and a two-pole permanent magnet rotor, as is known in the art.

The drawings are only schematic and are non-limiting. In the drawings, the size of some of the elements may be exaggerated and not drawn on scale for illustrative purposes.

In the different drawings, the same reference signs refer to the same or analogous elements. Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the present invention the terms "motor phase", "phase winding" and "motor coil" are used as synonyms.

In the present invention the term "moving average" and "running average" are used as synonyms and in their normal meaning.

In the present invention the term "adaptive threshold" and "dynamic threshold" are used as synonyms.

In the context of the present invention, "stalling of a motor" refers to the abrupt stopping of the turning of the motor, thus ceasing operation.

The present invention is applicable to multi-phase motors having only two windings, or only three windings, or more than three windings. The principles of the invention will be described for a motor having exactly three windings, but the invention is not limited thereto.

BACKGROUND INFORMATION

FIG. 1 is a schematic representation of a motor 2 comprising a three-phase, star connected brushless direct current (BLDC) stator and a two-pole permanent magnet rotor 5. The rotor is indicated as a bar magnet 5 having a north and south pole. The stator comprises three windings connected at one end to a so called "star" point, the other ends U, V, W (also called terminals) being accessible, e.g. for being driven by a motor driver stage 4 (for example FIG. 3). The stator windings are represented by inductances Lu, Lv, Lw (indicated in black), but the windings also have an electrical resistance Ru, Rv, Rw. The motor 2 can be driven by applying voltage waveforms to the terminals U, V, W, so that a current can flow through one or more of the windings.

In some brushless sensorless DC (BLDC) motors, it is common to simultaneously apply a voltage only to two of the three terminals, and to leave the third terminal unconnected (floating) for measuring a back electromagnetic force (also referred to as Back EMF, or BEMF). In that way, two of the windings are energized, and the third winding is left un-energized (e.g. left open). For example, when VDD is applied to terminal V, and GND is applied to terminal W, a current as indicated by arrow Imst1 will flow through the windings Lv and Lw, while (when the motor is running) a back-EMF will be generated in the winding Lu, which can be measured at terminal U. This is well known in the art, and further details can be found in literature.

The shape of BEMF can e.g. be trapezoidal or sinusoidal, depending on how the windings are located on the stator. A trapezoidal BLDC motor can be driven by alternately applying the supply voltage VDD to one of the windings, and the ground voltage GND to another of the windings, while leaving the third winding open (tri-state), during a certain time period. FIG. 1 shows six arrows, indicated as Imst1 to Imst6, representing six possible motor states MST1 to MST6, lying 60° apart, as is known in the art.

The present invention is, however, not directed to such so called "block mode" or "trapezoidal mode" commutation, but rather to motors e.g. PMSM motors, whereby three phases are driven simultaneously (not just two), e.g. using sinusoidal waveforms or using the space space-vector-waveform as voltage drive (looks like double sine wave), but not block waves. Such motors produce less noise and less vibrations, and in the case of the space vector waveform provide 15% more power from the same power supply. The sinusoidal or sinusoidal-alike waveforms can be approximated by staircase functions, a technique known in the art as "micro-stepped" operation, as will be further described below.

Stall detection is a method to detect whether the motor has stopped rotating. One method of detecting a stopped or blocked rotor of a sensorless motor is by means of measuring BEMF. The BEMF voltage (or rather: the amplitude of the BEMF waveform) is proportional to the angular velocity of the rotor. If the rotor is blocked or has stopped, the BEMF voltage is zero, and (for a same supply voltage) the current through the windings increases. Hence, instead of using the BEMF voltage measurement, one could also detect a rotor stop based on current increase as an indirect detection method. One implementation based on this principle is disclosed in U.S. Pat. No. 7,432,682(B2), which will now be briefly discussed, with reference to FIG. 2 and FIG. 3.

Figure 2:
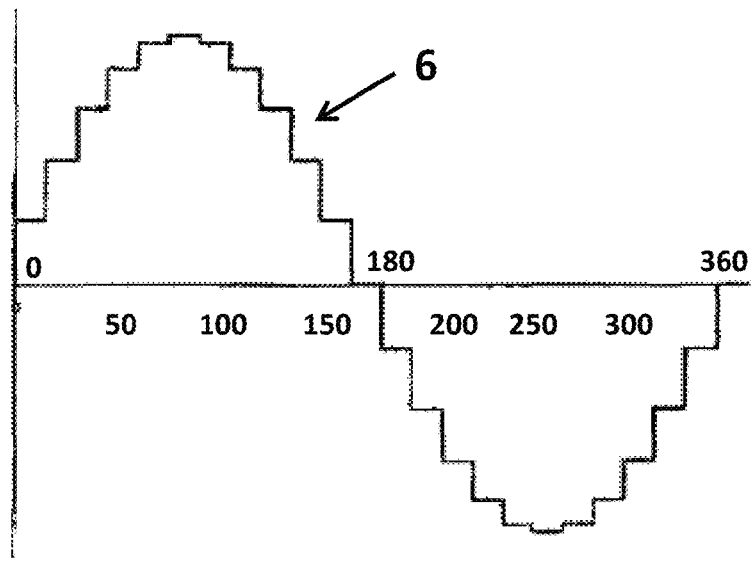
FIG. 2 shows a so called micro-stepped waveform which is an approximation of a sinusoidal function, known in the art. The waveform has 24 micro-steps per electronic period.

FIG. 2 (copy of FIG. 1 of U.S. Pat. No. 7,432,682B2) shows an example of a micro-stepped waveform 6 with 24 micro-steps. The sinusoidal three-phase motor 2 of FIG. 1 can be driven in clockwise or counter-clockwise direction by applying three such waveforms to the motor terminals U, V, W simultaneously, whereby the three waveforms are respectively 120° and 240° phase shifted with respect to one another, depending on the desired direction of rotation. Such waveforms can for example be generated by means of the motor driver circuit 4 of FIG. 3, whereby six transistors Q1 to Q6 are switched on/off by means of PWM-signals applied to their gates, in a manner known in the art.

Figure 3:
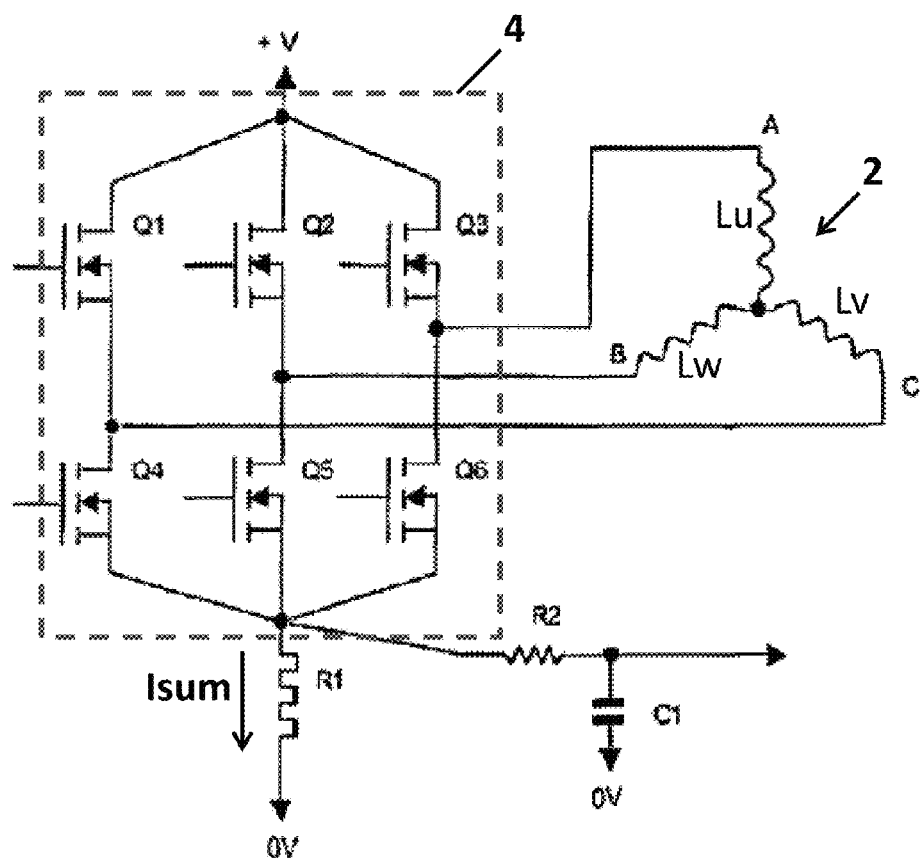
FIG. 3 shows a drive circuit known in the art, which can be used for generating the waveforms of FIG. 2 for driving the phase windings of FIG. 1.

FIG. 3 (copy of FIG. 2 of U.S. Pat. No. 7,432,682B2) shows a drive circuit 4 having six transistors Q1-Q6 arranged to form three dual H-bridges, the midpoints being connected to the three phase windings Lu, Lv, Lw of the motor 2. The sum of the currents Isum running through the motor windings is measured by using a resistor R1 connected between the driver stage 4 and ground 0V. In U.S. Pat. No. 7,432,682B2, the sum of currents is not read out directly, but is low-pass filtered by means of a resistor R2 and capacitor C1. The total current is then sampled, and the variance of the samples is calculated, and based on said variance, it is decided whether the motor has stopped rotating or not.

The inventors of the present invention have found, however, that the stall-detection described in U.S. Pat. No. 7,432,682B2 does not always work reliable under all circumstances, for instance in case of fluctuating supply voltage, mismatch in motor mechanics/magnetics. Moreover, the inventors have found that normal load changes during run-mode in combination with the R-C low-pass filter (which R-C values may change over temperature) change the min-max filter values and change the variance. Furthermore, they realized that an implementation based on statistical analysis requires a relatively powerful processor. The inventors came up with several improvements, as will be described next.

Stall Detection—Basic Algorithm

Figure 4:
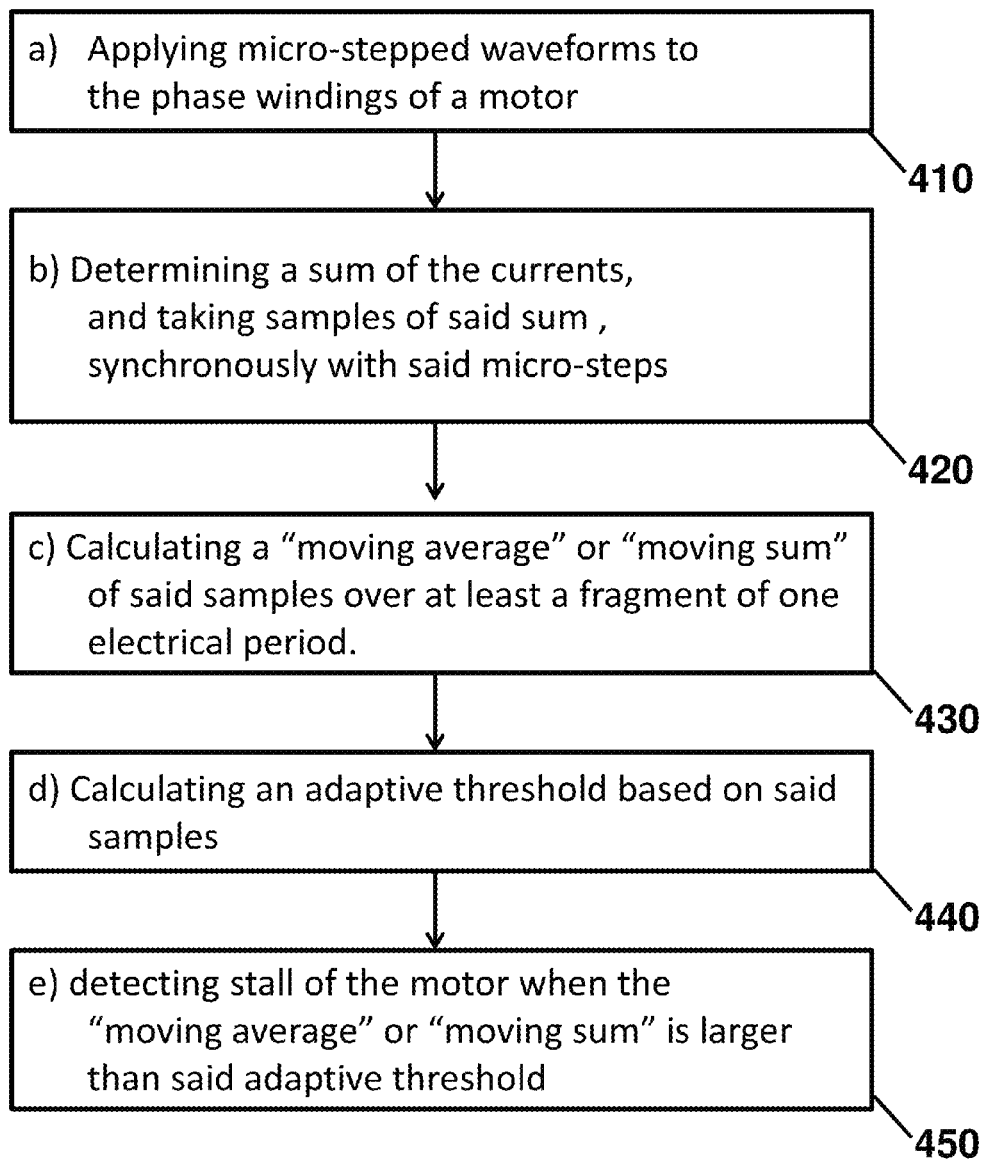
FIG. 4 is a flow chart of a method of detecting whether a multi-phase sensor-less motor has stalled, according to embodiments of the present invention. It is based on determining whether the total current through the motor has increased above a "normal" level. More in detail, it is based on taking samples of the sum of currents, determining a moving average over some of these samples, determining a dynamic threshold for determining which current is "normal" and which current is "too large", and deciding whether the motor has stalled, based on a comparison of said moving average with said dynamic threshold.
Figure 5:
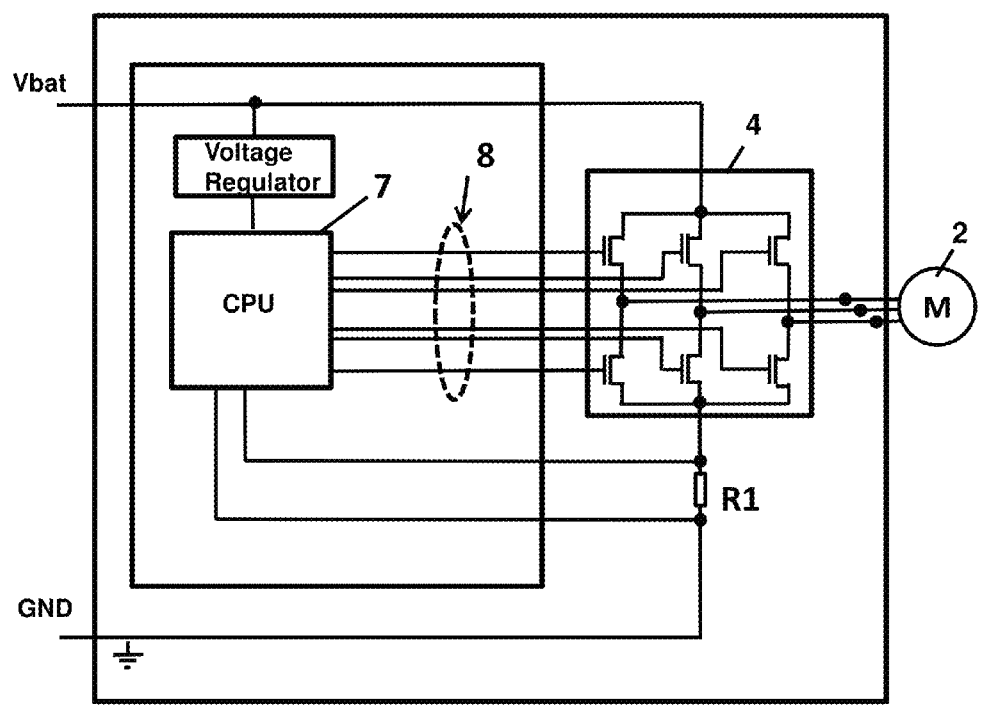
FIG. 5 shows a block-diagram of an example of an electronic circuit according to embodiments of the present invention, which can be used to perform the method of FIG. 4.

FIG. 4 shows a flow chart of a method according to an embodiment of the present invention, and FIG. 5 schematically illustrates an example of an electronic circuit 1 that can be used for executing this method. It is noted that the driver stage of FIG. 5 is very similar to the one shown in FIG. 3, except for the low-pass filter R2, C1, which is not present in embodiments of the present invention.

In a first step 410 of the method, three micro-stepped waveforms, e.g. similar to the one shown in FIG. 2, but optionally scaled in amplitude, scaled in time, and optionally having more than 24 or less than 24 steps, is applied to each of the phase windings Lu, Lv, Lw by means of a controller, for driving the motor 2 in a manner which is known in the art. The controller can e.g. be a microcontroller 7, or an ASIC, or a hybrid integrated motor control IC, etc.

In a second step 420, the sum of the currents Isum flowing through the phase windings Lu, Lv, Lw is determined, e.g. by means of a resistor R1 (FIG. 5), and samples are taken of said sum of currents Isum. This can e.g. be achieved by measuring a voltage over the resistor R1, e.g. by means of an ADC inside the controller 7. According to an important aspect of the present invention, each of these samples is taken synchronously with the micro-steps of the driving waveform signals. Preferably the samples are taken at a moment when the transient behaviour of each "micro-step" has disappeared, e.g. at the end of each micro-step. Such synchronism can be relatively easily achieved if the waveforms are generated in the same processor 7 as the processor that measures the sum of currents. It is an advantage of synchronous sampling that it avoids sampling transients, and thus results in a cleaner signal.

In a third step 430, a "moving average" (also known as "running average") is taken of said samples over a predefined fraction of the electrical period of the micro-stepped waveform, or over one complete period. More specifically, if the waveform would e.g. have 48 micro-steps per electrical rotation, then the running average is preferably taken over 16 samples, corresponding to 120° phase. Alternatively (but not preferred) the running average could also be taken over multiples of 120°, for example over 240° (32 samples) or 360° (48 samples), etc. The minimum running average sample size is 8, which corresponds to 60 electrical degrees which is the natural commutation period for three-phase motors (6×=3 coils*2 current directions); but taking two commutations (120 deg) gives a more stable average in most cases, due to slight motor asymmetries in coil impedance which repeat every two commutations. If the waveform of FIG. 2 is used, having 24 micro-steps per electrical period, the moving average is preferably calculated over 8 samples, or multiples of 8 samples. Such averaging operation provides a relatively stable total current, whereby the effects of micro-stepping are substantially reduced. In other words, the running average shows very little "ripple" (when the motor is running at substantially constant speed).

Preferably, but not necessarily the number of microsteps per "full step" is chosen as a power of two, for example, 2, 4, 8, 16, 32, etc. microsteps per "full step" (i.e. 60° in case of a three-phase motor), yielding 12, 24, 48, 96, 192, etc. microsteps for a complete electrical rotation (i.e. over 360°).

Furthermore, such a calculating is extremely simple, as it includes only simple mathematics (e.g. in the case of 48 micro-steps, only 15 additions and a single division per micro-step, but no squares nor square root nor sum of squared differences, etc). Moreover, the "running average" can be calculated based on a previously calculated running average value, (or rather the "running sum" before the division operation) by merely subtracting the oldest sample and adding the newest sample, instead of effectively calculating the sum of the 16 most recent sample-values (15 addition operations). This allows the running average (resp. running sum) to be calculated at every micro-step by using only 1 subtraction and only one addition (and one optional division) operation, which is much "cheaper" than calculating a standard deviation, as described in the prior art. Indeed, if a "running sum" is calculated instead of a "running average", the division operation can be omitted, resulting in a single subtraction and a single addition per micro-step.

In a fourth step 440, an adaptive threshold value is calculated (at each micro-step), based on at least some of the samples already taken, and in a fifth step 450, the running average (resp. running sum) value is compared to the adaptive threshold, and if the running average (resp running sum) is higher than the adaptive threshold, it is concluded that the motor 2 has stalled or reached an end stop, otherwise it is concluded that the motor 2 is running as required.

By basing the threshold value on samples already taken, no additional measurements (such as BEMF) need to be performed. By comparing the running average (resp running sum) with an adaptive threshold, as opposed to comparing the running average (resp running sum) with a fixed predetermined value (e.g. based on the electrical resistance of the phase wires measured at production time), aspects such as load variations, maximum speed variations, aging, wear, friction, temperature influences, or any other relatively "long-term" aspects are automatically taken into account, which is a huge advantage. Moreover, calibration (which is very expensive in a production environment), and/or extra non-volatile memory for storing the measured resistance values etc. can be avoided.

In an embodiment said adaptive threshold is calculated as a low-pass filtered version of the running average (resp. running sum) calculated before, multiplied by a predetermined constant, for example multiplied by 1.25 for allowing a 25% increase of the average current before it is decided that the motor has stalled.

In an embodiment, a first order IIR-filter is used to perform this LPF-function. As an example, the following function may be used $$Y[k]=(Y[k-1]*127+X[k])/128,$$

where X[k] represents the sampled sum of currents at time (micro-step) k, and Y[k] represents the LP-filtered signal. The corner-frequency of this filter is 128 commutation periods (i.e. 128 micro-steps), which is a suitable filter in case the sinusoidal waveform has 48 micro-steps, but other suitable corner frequencies may also be used.

The predefined constant value (the "factor") may be value in the range of 1.10 to 1.50, preferably in the range of 1.15 to 1.40, more preferably in the range of 1.20 to 1.30, for example equal to 1.20 or 1.25 or 1.30. The skilled person can find a suitable range by performing routine tests performed on the particular application. For example, if the motor is used for detecting stall of an airco-flap having a particular mechanism (gearbox, transmission ratio, geometry, friction, material elasticity, etc), the predefined constant may be different from that of a grill shutter in the same vehicle, but having e.g. a different motor or gearbox or materials or geometry or elasticity, etc.

The idea behind the basic algorithm is that the running average (resp running sum) represents the average total current, and the adaptive threshold tries to follow this value, but when the running average (resp. running sum) suddenly increases with e.g. 25%, then an abnormal situation has occurred, which is interpreted as a motor stall.

It is noted that the method of the present invention does not use the amplitude of the ripple or spikes occurring during a motor stall situation, but instead is based at the low-frequency component of the total motor current.

Figure 6:
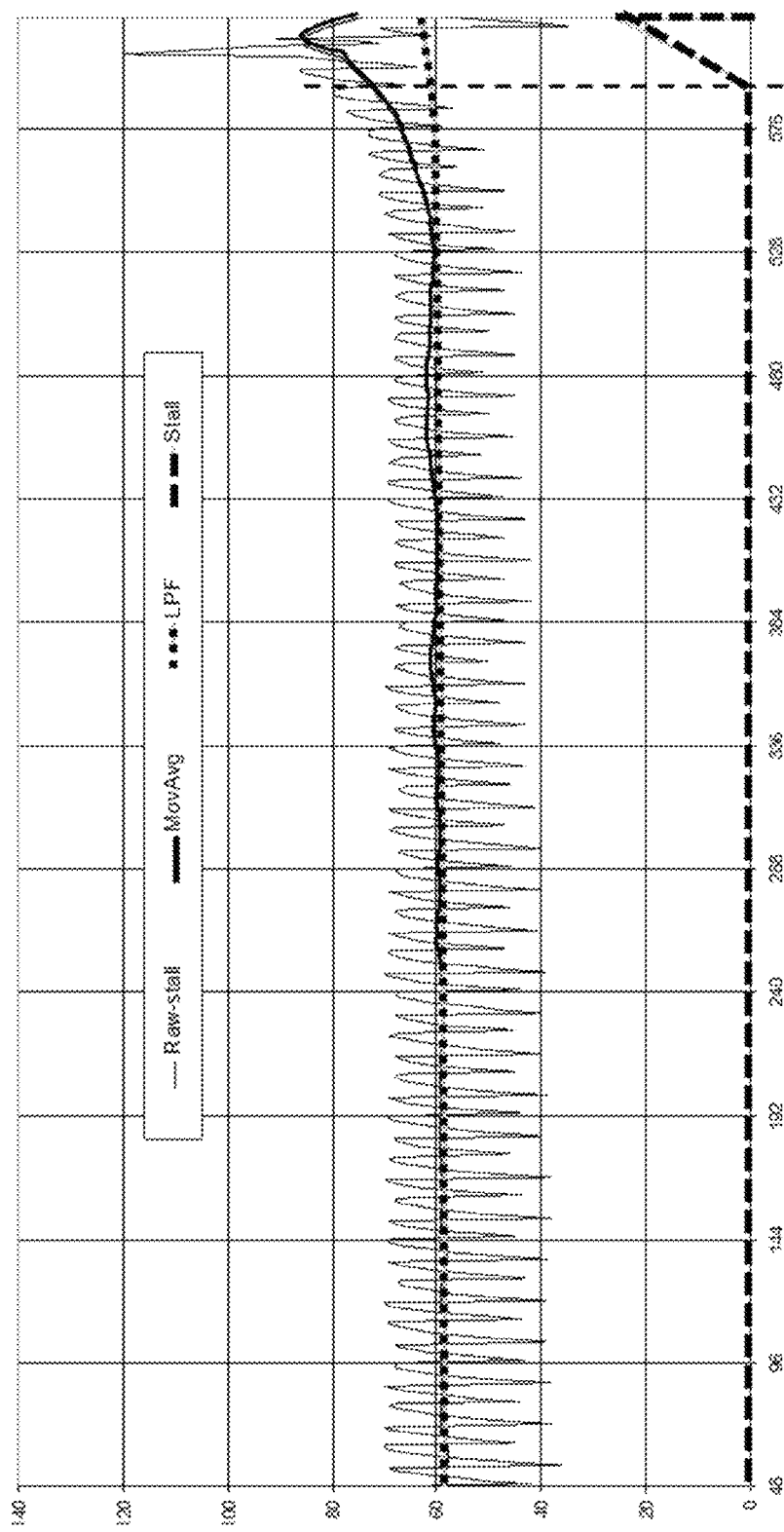
FIG. 6 illustrates the basic algorithm proposed in FIG. 4. It shows a plurality of samples (interconnected by a thin line), a moving average thereof (thicker line), and a dynamic threshold (dotted line). The curve at the bottom (dashed line) shows when motor-stall was detected.

FIG. 6 illustrates by means of an example how the method (algorithm) of the present invention works. On the X-axis the time is displayed as a number of micro-steps. On the Y-axis, sample values indicative for the sum of currents Isum are shown as digital numbers (e.g. the ADC-value). It is noted that the absolute value of the current is not really important for the algorithm (provided of course that the ADC and counters and filter have a sufficient range and accuracy and do not clip). The "raw" sample values are interconnected by means of line-segments (for illustrative purposes), whereby one sample is taken at the end of each micro-step. On the left of FIG. 6 (from about sample #48 to about sample #528), the motor is running at substantially constant speed; on the right of FIG. 6 (starting from about sample #528) the motor has reached an end stop or has stalled for another reason. In this example, a moving average MovAvg is calculated over 16 sample values, and is shown in a somewhat thicker line (overlapping the dotted line for samples lower than #240). As can be seen, while the raw sample values in the example vary between about 40 to about 70 (on the left half of the figure), the moving average is substantially constant (in the range of about 57 to about 63 for micro-step #48 to #528), but then gradually increases to a value of about 85. In dotted line, a low-pass version of this moving average is shown, which has a value of about 58 to about 60 for micro-step #48 to #576, but then slowly increases, although not as fast as the moving average. When the difference between the two lines (MovAvg versus LPF) becomes too large, as determined by the predefined factor (in this case chosen as 1.20 for example), it is decided, according to aspects of the present invention that the motor has stalled.

At the bottom of FIG. 6, it is shown that a counter was started at the moment where a stall situation was detected, which is the moment at which the samples of the black line are larger than 1.20× the value of the dotted line. (in practice, a single flag "yes"/"no" is sufficient, but a ramp function display was used for development purposes).

Acceleration and Deceleration

Figure 7:
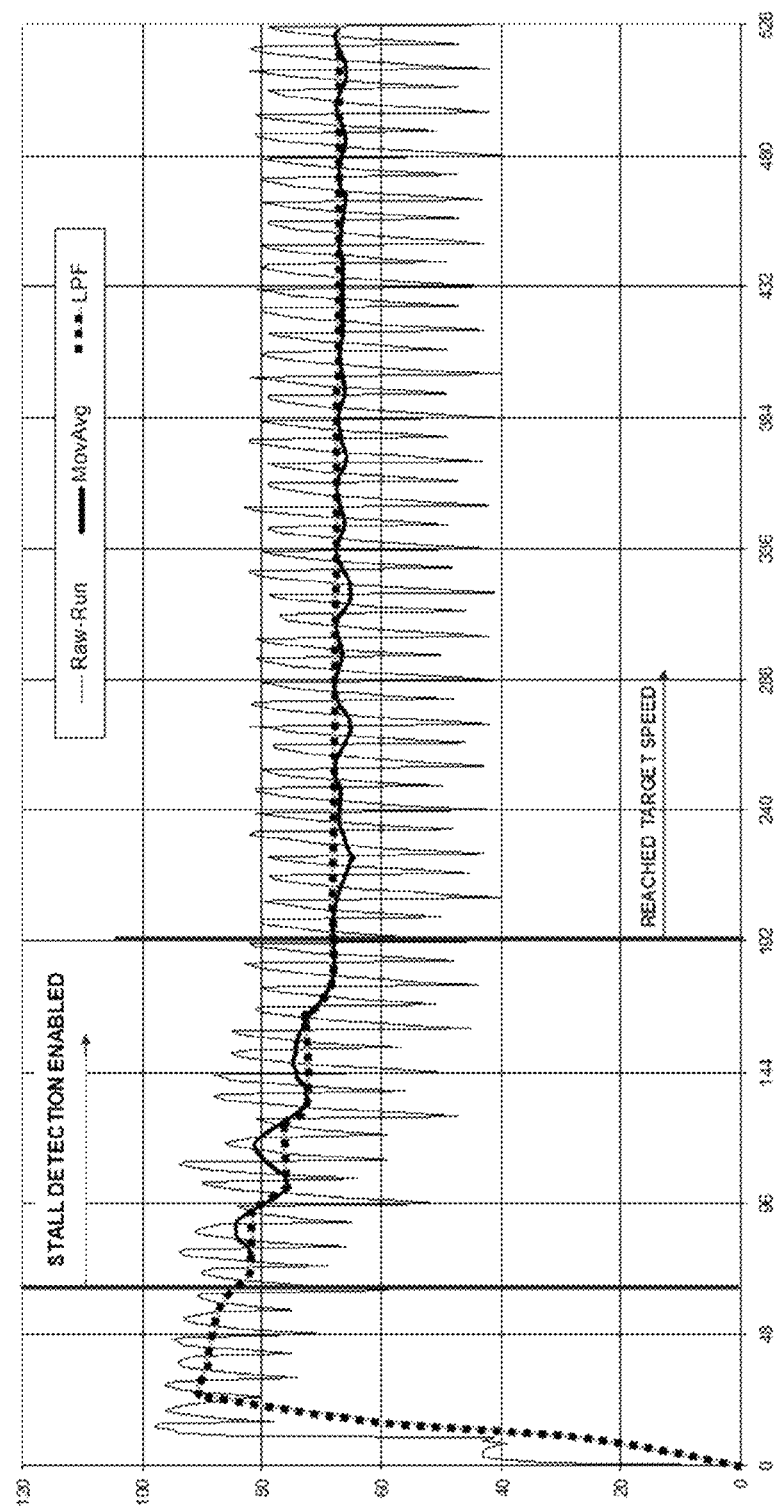
FIG. 7 shows a variant of FIG. 6, illustrating that the stall-detection may be disabled during acceleration or deceleration, according to an optional feature of the present invention.

FIG. 7 shows a slight variant of the basic algorithm illustrated in FIG. 6. It simply shows that, during acceleration and deceleration of the motor (e.g. during start-up) the stall detection is preferably disabled. The reason is that the reaction speed of the detection-algorithm is much higher than the reaction speed of the motor due to mechanical inertia, especially for the kind of applications where the motor is driven using a sinusoidal waveform with constant (e.g. maximum) amplitude from zero-speed (start-up) to target speed, hence the motor current will be high, and fluctuations on the motor current may cause incorrect stall detection. In order to avoid false stall detections, the stall-detection mechanism can simply be disabled during acceleration and/or deceleration. In the example shown, the stall detection is disabled for the first 64 samples (1.33 electric rotations in this case). The skilled person can find a suitable value for the number of samples to be skipped (here: 64), e.g. by trial and error, depending on the specific implementation (size of motor, gearbox, friction, etc). In fact, disabling is only an optional feature of the method of the present invention, since the same effect can also be obtained in other ways, e.g. by simply ignoring false stall-detections in higher software levels, during acceleration or deceleration.

Re-Stall

Figure 8:
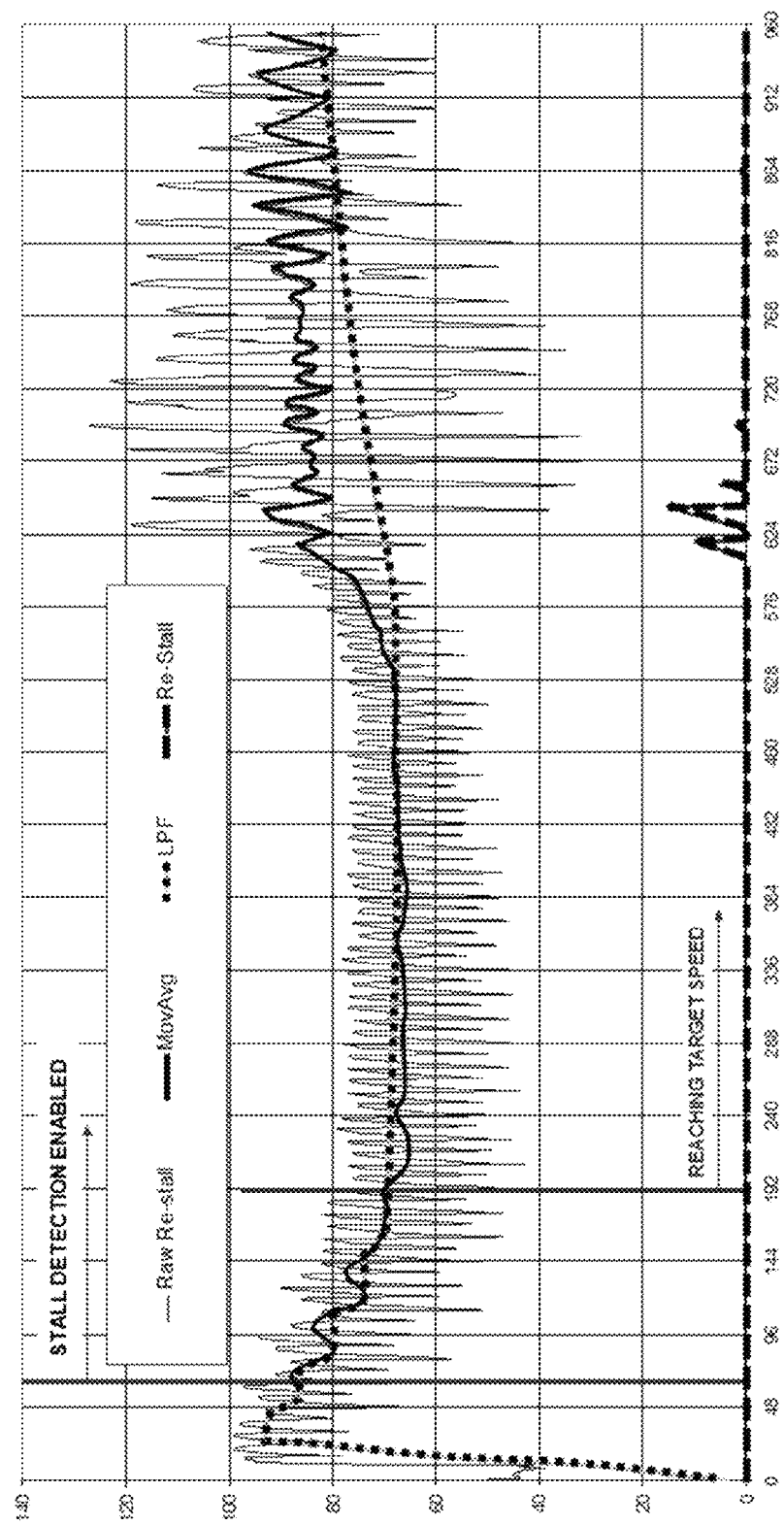
FIG. 8 shows a further variant of FIG. 7, for illustrating problems of re-stall detection, as may be solved by a second optional feature of the present invention.

FIG. 8 shows a further improvement of the method shown in FIG. 7 (in fact, FIG. 7 is part of FIG. 8 for samples #0 to #428), the relevant part of FIG. 8 being the right half. It was noted by the inventors that the method as described above correctly detects a "first stall" situation (at about sample #600 in this example), a "second stall" situation at about sample #624, a "third stall" situation at about sample #648, and a "fourth stall" situation at about sample #696, but the stall situation is not detected anymore thereafter. The reason is that the adaptive threshold has also gradually increased from about 70 (the "normal" value in this example) to about 80. Hence, the basic algorithm is not able to reliably detect re-stalls. This problem can be addressed at higher software level, by taking appropriate measures when the first stall situation is detected. This problem can also be solved at the driver level, for example as follows: after a first stall has been detected, an internal stall-flag will be set and the direction of rotation will be remembered (e.g. clockwise). In case a new movement command is received in the same direction (also clockwise), the motor is first rewound for a number of steps (counter-clockwise), and then the motor is activated in the requested direction (clockwise). It is noted that this solution might not be acceptable for all applications, for example when closing a valve in a chemical factory, but may well be acceptable for controlling an air-flap of an air-conditioning system in a vehicle, e.g. in a car.

Optionally an additional check can be added to check if the motor is stuck from the start, namely under circumstances the LPF filtered current at start must decrease from max level (100%) to a lower level (e.g. 80%) after acceleration due to BEMF when moving; if it is detected that there is no LPF reduction, the motor is stuck (see normal effect at start in FIG. 7 and FIG. 8). In this case an electrical error can be reported to the controller, e.g. to the master ECU.

Compensation for Supply Voltage Variations

As already mentioned, slowly varying influences (e.g. having a time constant of at least 1.0 second), such as wear or temperature variations (e.g. ambient temperature variations) or supply voltage variations (e.g. full or empty battery) are efficiently handled by the use of the adaptive threshold.

However, the inventors have found that in an automotive environment, this is not always sufficient, because especially the supply voltage (Vbat) is not a constant voltage of for example 12.0 V+/−0.1 V, but can vary largely even within a small time period, for example due to switching on/off the alternator, and/or switching on/off an air-conditioning unit, switching on/off the lights, etc. This is even more the case in electrical vehicles, where the motor itself is battery powered.

Let us first describe how a motor driver circuit such as that of FIG. 3 works when operated to produce the micro-stepped waveform of FIG. 2, when provided with a constant supply voltage of 12.0 V. Assume that the waveform of FIG. 2 is stored as a table of the following 24 values: WaveformTable=[25%, 50%, 70%, 85%, 95%, 100%, 95%, 85%, 70%, 50%, 25%, 0%, −25%, −50%, . . . , 0%] (here represented as percentages, but other representations can also be used). If the voltages applied to the motor phase windings are generated by means of a PWM-signal (coming from a controller 7) driving the gates of the transistors of the driver state 4 as shown in FIG. 4, the transistors being powered by the (unregulated) supply voltage Vbat, then the voltage applied to the phase would be:

$$V\text{phase}=V\text{bat}*PWM\text{dutycycle};$$

whereby Vbat is 12.0 V, and PWMdutycle is taken from the waveform-table. Hence,

U at micro-step 0 is 12V*25%=3.0V;
U at micro-step 1 is 12V*50%=6.0 V;
U at micro-step 2 is 12V*70%=8.4 V;

etc., and the values of the other two windings V, W are 120° phase shifted.

However, considering now that the supply voltage varies (e.g. pseudo-randomly) between 9.0 V and 15.0 V, (which is not unusual in for instance vehicles), then the actual voltages applied to the phase winding also vary pseudo-randomly, as follows:

$$U \text{ at micro-step } 0=(9V\text{-}15V)*25\%=2.25\text{-}3.75\ V;$$

$$U \text{ at micro-step } 1=(9V\text{-}15V)*50\%=4.5\text{-}7.5\ V;$$

etc., and the values of the other two windings V, W are 120° phase shifted, which waveforms may look completely different from that of FIG. 2.

Since the phase current is dependent on the phase voltage, according to the (approximate) formula:

$$V\text{phase}=V\text{bemf}+(I\text{phase}*Z\text{phase}),$$

with Vbemf being substantially proportional to the angular velocity (at constant angular speed), and Zphase being a combination of the inductance and the electrical resistance of the motor winding, it is clear that also the current through the phase windings will vary along with the supply voltage.

Since the stall-detection algorithm described above is based on monitoring the sum of the currents, it should then come as no surprise that the algorithm will not work reliably when used with a driver-stage powered by such varying supply voltage Vbat.

The classical approach to solve this problem would be to provide a stable voltage to the motor current driver stage 4 e.g. by using a DC-DC convertor, but that requires extra components, board space, and is rather expensive.

The inventors of the present invention surprisingly found a cheaper and more elegant solution, by regularly measuring the supply voltage Vbat (either directly or indirectly, e.g. by measuring the current flowing through a voltage divider connected between the supply voltage and ground), e.g. at each micro-step, and by using a PWM-signal based on both the waveform-table and the measured supply voltage Vbat, according to the formula:

$$PWM\text{corrected}=(V\text{min}/V\text{bat})*PWM\text{dutycycle},$$

where PWMcorrected is the PWM-signal actually applied to the motor driver, Vmin is the minimum supply voltage (in the example: 9V), Vbat is the supply voltage measured in the present or in the previous micro-step (in the example: a voltage in the range of 9V-15V), and PWMdutycycle is the PWM-value taken from the waveform-table corresponding to the specific micro-step.

In a practical implementation, the values of the waveform-table may already be multiplied by the fixed value Vmin, so that the actual correction only needs to divide the table-value by the measured supply voltage Vbat.

In other words, when the micro-stepped waveforms are generated by PWM, whereby the PWM-value is not simply taken from a waveform-table, but is corrected with a factor inversely proportional to the measured supply voltage Vbat, then current waveforms (like that of FIG. 2) will be obtained in the motor windings, which waveforms have a reduced dependency on the supply voltage variations, and ideally are completely compensated for supply voltage variations, even when the supply voltage Vbat varies largely.

A method that applies these "corrected" or "supply-voltage compensated" PWM signals to the motor driver stage 4, and that uses one of the algorithms of stall detection as described above (i.e. the basic algorithm with or without the optional disabling during acceleration/deceleration, and with/without the optional reverse rotation), is thus more robust against supply voltage variations.

It is unlikely that the supply voltage Vbat will change faster than the duration of a micro-step, although this may happen at very low motor speed, e.g. a speed below a predefined threshold (then the microsteps are longer in time). This problem can be addressed in several ways, e.g. by adding extra capacitors over the driver stage 4, and/or by taking multiple samples of the supply voltage Vbat and averaging the supply voltage during a single microstep in the case where the motor is driven at a speed below a predefined threshold, and/or by taking multiple times per microstep a single sample of the supply-voltage Vbat and applying a corresponding PWM value for a fraction of the duration of the micro-step.

IN SUMMARY

A method and an electrical circuit are presented for detecting whether a motor has stalled or reached an end stop. The basic stall-detection method is shown in FIG. 4, and is based on detecting a current increase through the motor windings (or through the motor driver).

A first optional improvement to increase robustness of the method, can be achieved by disabling the stall-detection during acceleration and deceleration. A second optional improvement can be achieved by shortly powering the motor in the reverse direction prior to powering the motor in the desired direction. A third optional improvement is related to compensation of the PWM signals that are used for generating the micro-stepped waveforms against variations of the supply voltage.

Embodiments of the present invention may comprise none of the optional improvements, or only one of the optional improvements (e.g. only the first, or only the second, or only the third), or two of the optional improvements (e.g. the first+the second, or the first and the third, or the second and the third), or all three optional improvements (i.e. the first+the second+the third).

Further variations or modifications of embodiments of the present invention are possible. For example, the following alterations are also contemplated, either alone or in combination, as set-out by the claims.

Instead of calculating the running average (or "running sum") every micro-step, it is also possible to calculate the running average e.g. only every two micro-steps, or only every four micro-steps. This allows to further reduce processing power.

Instead of measuring the supply voltage (if this optional feature is used) at every micro-step, it would also be possible to measure it only every two micro-steps, or only every three micro-steps, etc. This allows to further reduce processing power.

The number of micro-steps per electrical period can be chosen for example to be 12 or 24 or 48 or 96 or 192 (for a three phase motor) or 8, 16, 32, 64, 128 (for a two-phase motor), but other values may also be used. The more micro-steps per electrical period, the more accurate the sine-wave can be approximated, but the more processing power is required.

The moving average (or moving sum) is preferably calculated over 120° (i.e. two "full steps" of 60°) angular distance in case of a three-phase motor, and over a 180° (i.e. two "full steps" of 90°) or 360° (i.e. four "full steps" of 90°) angular distance in case of a two-phase motor, but the invention would also work if the running average (or running sum) were calculated over multiples hereof.

Instead of calculating a "running average", it is also possible to calculate a "running sum". In this way, a division operation can be omitted every micro-step.

The sum of currents is preferably measured by means of a single resistor connected in series with the driver stage 4, but it is also possible to measure the current through each winding individually, and to add the individual current values.

The invention claimed is:

1. A method of detecting stall of a two-phase or three-phase motor operated in a micro-stepped mode, the method comprising:
   a) applying a plurality of phase-shifted micro-stepped waveforms to the phase windings of said motor, whereby the phase-shift is 120° in case of a three-phase motor and 90° in case of a two-phase motor;
   b) determining a sum of currents flowing through the phase windings of said motor, and taking samples of said sum of currents synchronously with the application of said micro-stepped waveforms;
   c) calculating a moving average or a moving sum of said samples over a number of samples corresponding to 120° or an even multiple of 60° of the micro-stepped waveform in case of a three-phase motor and corresponding to 180° or an even multiple of 90° of the micro-stepped waveform in case of a two-phase motor;
   d) calculating an adaptive threshold based on said samples;
   e) detecting stall of the motor when the moving average or moving sum is larger than said adaptive threshold.

2. The method of claim 1, wherein calculating the adaptive threshold comprises calculating a low-pass-filtered version of said moving average or moving sum, and setting the adaptive threshold as the low-pass-filtered version of the moving average or moving sum multiplied by a predefined constant value.

3. A method according to claim 2, wherein the predefined constant value is chosen in the range of 1.10 to 1.50.

4. A method according to claim 2, wherein calculating a low-pass-filtered version of the moving average or moving sum comprises calculating said low-pass-filtered version by means of an IIR filter.

5. A method according to claim 1, wherein said sum of currents is measured over a resistor.

6. A method according to claim 1, wherein the motor is a bipolar BLDC motor or a bipolar stepper motor or a unipolar stepper motor or a three-phase BLDC motor or a single coil two-phase BLDC motor or a three-phase stepper motor.

7. A method according to claim 1, wherein applying said micro-stepped waveforms comprises applying PWM-signals to a motor driver circuit.

8. A method according to claim 7, further comprising a step of measuring a supply voltage supplied to the motor driver circuit, wherein the PWM signals are generated taking into account the measured supply voltage such that the resulting current through the phase windings is independent of the supply voltage.

9. A method according to claim 8, wherein the supply voltage is measured multiple times during a single microstep, and wherein during said single microstep multiple corresponding PWM-signals are applied during a fraction of the microstep.

10. A method of driving a multi-phase motor in a first direction until an end stop, the method comprising the steps of, subsequently:
   i) driving the motor in a second direction opposite the first direction;
   ii) driving the motor in the first direction using a method according to claim 1.

11. A computer program product for executing a method according to claim 1, when executed on a programmable processor of an electronic circuit comprising:
   a) means for applying a plurality of phase-shifted micro-stepped waveforms to the phase windings of said motor, whereby the phase-shift is 120° in case of a three-phase motor and 90° in case of a two-phase motor;
   b) an analog-to-digital convertor for taking samples of a sum of currents flowing through the phase windings in a manner synchronous with the application of said micro-stepped waveforms;
   c) the programmable processor configured for calculating a moving average or moving sum over a number of samples corresponding to 120° or an even multiple of 60° of the micro-stepped waveform in case of a three-phase motor and corresponding to 180° or an even multiple of 90° of the micro-stepped waveform in case of a two-phase motor, and configured for calculating an adaptive threshold based on said samples, and configured for detecting stall of the motor when the moving average or moving sum is larger than said adaptive threshold.

12. An electronic circuit for driving a two-phase or a three-phase motor and for detecting stall of said motor, the electronic circuit comprising:
   a) means for applying a plurality of phase-shifted micro-stepped waveforms to the phase windings of said motor, whereby the phase-shift is 120° in case of a three-phase motor and 90° in case of a two-phase motor;
   b) an analog-to-digital convertor for taking samples of a sum of currents flowing through the phase windings in a manner synchronous with the application of said micro-stepped waveforms;
   c) a programmable processor configured for calculating a moving average or moving sum over a number of samples corresponding to 120° or an even multiple of 60° of the micro-stepped waveform in case of a three-phase motor and corresponding to 180° or an even multiple of 90° of the micro-stepped waveform in case of a two-phase motor, and configured for calculating an adaptive threshold based on said samples, and configured for detecting stall of the motor when the moving average or moving sum is larger than said adaptive threshold.

13. The electronic circuit according to claim 12, further comprising a motor-driver circuit and PWM generators for applying PWM-signals corresponding to said micro-stepped waveforms to the motor driver circuit.

14. The electronic circuit according to claim 13, further comprising means for measuring a supply voltage supplied to the motor driver circuit, and wherein the PWM generators are configured for taking into account the measured supply voltage such that the resulting current through the phase windings is independent of the supply voltage.

15. A system comprising a two-phase or a three-phase motor, and a resistor configured for measuring a sum of the currents flowing through the phase windings of the motor, and an electronic circuit according to claim 12 connected to said motor.

* * * * *